Nov. 25, 1958
C. E. SECH, JR
2,861,514
DEEP FAT COOKING APPARATUS
Filed March 4, 1957
4 Sheets-Sheet 1
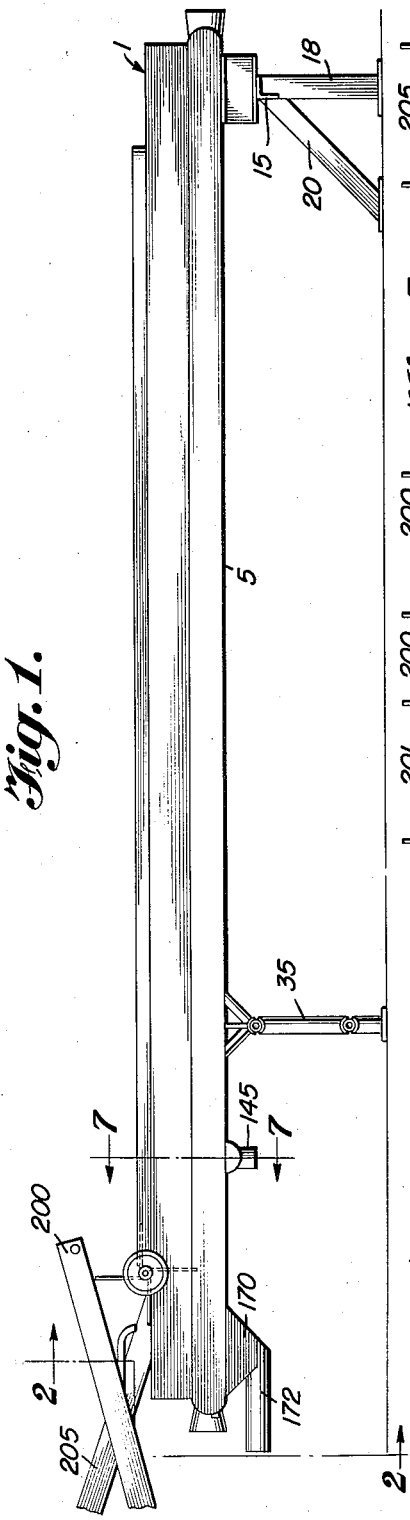
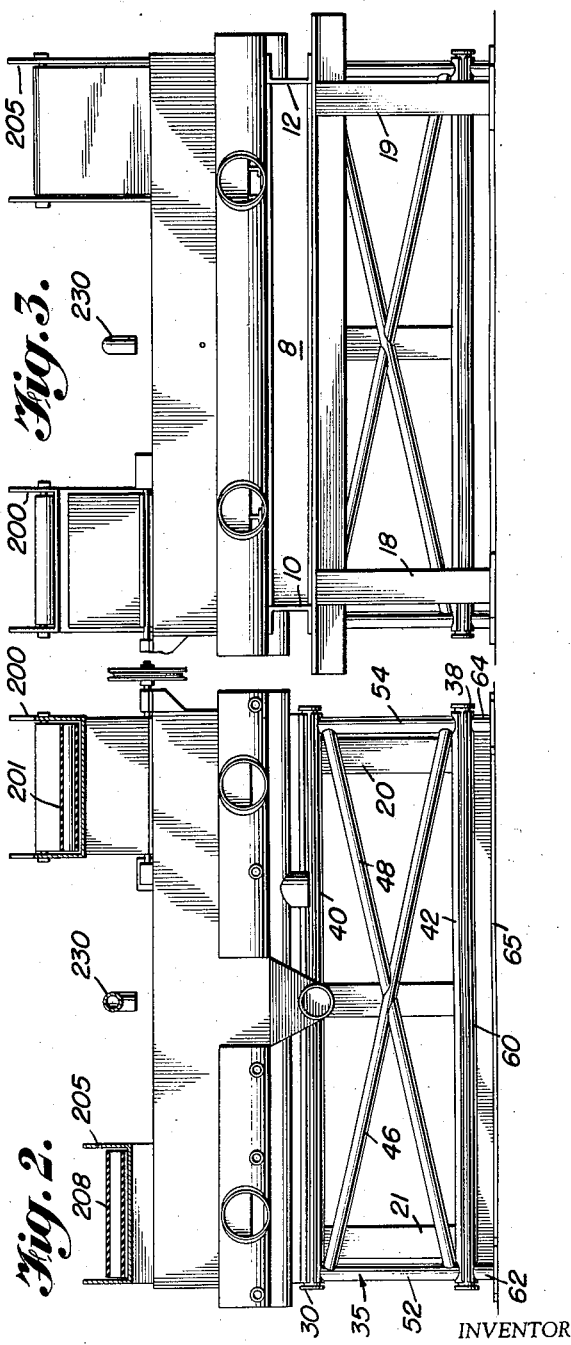
INVENTOR
Charles E. Sech, Jr.
BY Thomas, Weisman & Russell
ATTORNEYS

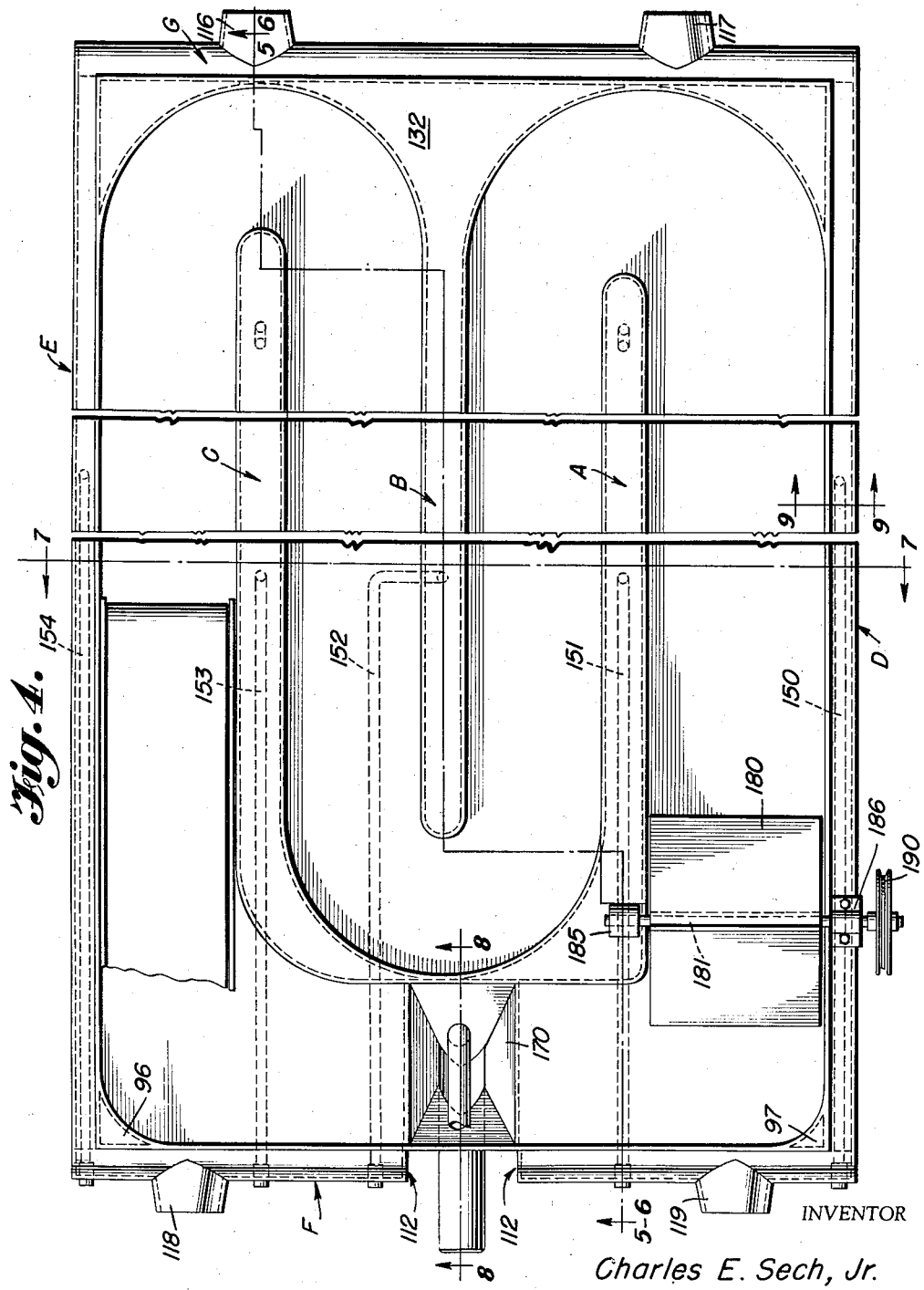

Nov. 25, 1958

C. E. SECH, JR 2,861,514

DEEP FAT COOKING APPARATUS

Filed March 4, 1957

INVENTOR
Charles E. Sech, Jr.

BY Thomas, Weisman & Russell
ATTORNEYS

Nov. 25, 1958 C. E. SECH, JR 2,861,514
DEEP FAT COOKING APPARATUS
Filed March 4, 1957 4 Sheets-Sheet 4
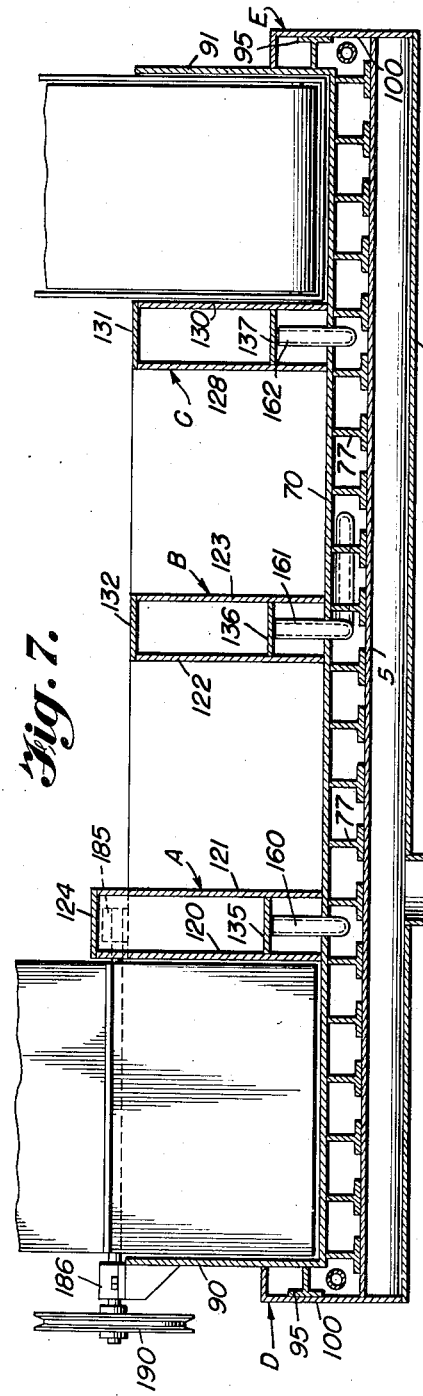
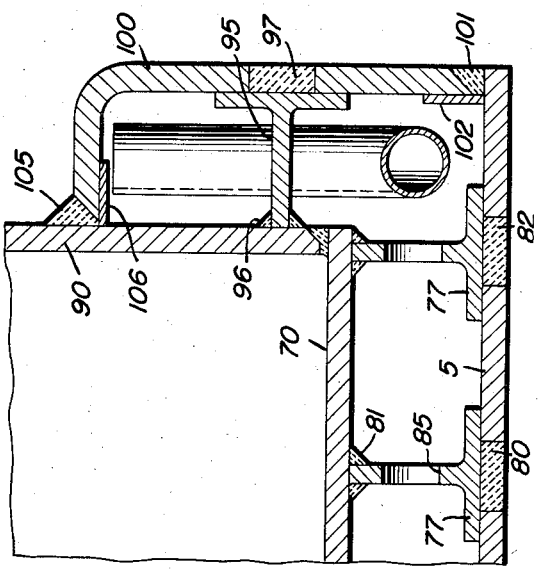
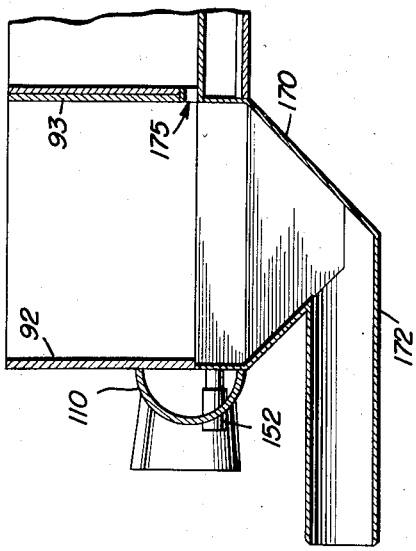
INVENTOR
Charles E. Sech, Jr.
BY Thomas, Weisman & Russell
ATTORNEYS

United States Patent Office 2,861,514
Patented Nov. 25, 1958

2,861,514

DEEP FAT COOKING APPARATUS

Charles E. Sech, Jr., Ann Arbor, Mich., assignor to Wise Potato Chip Company, Berwick, Pa., a corporation of Pennsylvania Application March 4, 1957, Serial No. 643,810

4 Claims. (Cl. 99—406)

This invention relates in general to a method and apparatus for cooking potato chips. In its more particular aspects, the invention involves the use of a so-called multipass trough or pan for cooking purposes. Although the description thereof is drawn with specific reference to potato chips, it can also be used for cooking potato sticks or any other French-fried foods. The use of the phrase "potato chips" hereinafter is to be construed as referring to potato chips merely as the commonest example of the field of application of this invention.

Primarily, the fundamental advance contributed by this invention is the concept, and means for accomplishing such concept, of applying an even and uniform temperature throughout the cooking oil, having respect to both depth and planar dimensions of the oil bath.

The instant invention obviates many disadvantages of the prior art by, firstly, providing an indirect application of heat to the cooking vessel, thereby eliminating such problems as have to do with destruction or rancidity of the cooking oil; secondly, by the apparatus and method herein disclosed, the temperature of the cooking oil at any given point in the pan can be controlled to within plus or minus 3° F.

It is, accordingly, a primary object of this invention to provide a means and method for cooking a potato product in a multipass pan construction wherein the cooking temperature is even and controlled, can be varied within definite limits and maintained within those limits so that the product is cooked uniformly and evenly as desired.

A further object of the invention is the provision of apparatus that eliminates the direct firing principle and consequently obviates all of the disadvantages flowing from direct flame application. In this respect, application of heat to the cooking vessel is obtained through effective use of a vapor phase heating medium, such as Dowtherm, which is so admitted and controlled both through the circuitous side walls of the multiple pass construction, and through the end, side and bottom jackets, that its imparted heat reaches all of the cooking oil throughout its depth. By Dowtherm is meant a form of eutectic solution which enables careful and accurate control of the desired temperature of the cooking bath. There are several forms of Dowtherm which may be employed, of which the following is an example: a mixture of diphenyl oxide and diphenyl in relative proportions of approximately 3 to 1. Obviously, in this equipment, whatever form of Dowtherm is utilized is used in the vapor phase.

A further objective of this invention is the provision of a cooking vessel having side walls and centrally located and circuitously shaped baffles that interiorly receive this heating medium to a height consistent with the height of the cooking oil; this permits controlled application of the heat of the said medium throughout the body of oil.

Another object of the invention is the provision of apparatus adapted to remove effectively any impurities such as air or noncondensible gases which are present in or may be formed in this medium and to assure that the said medium is applied evenly and uniformly at the same pressure and temperature throughout the walls and baffles forming the circuitous enclosure or passageway for the cooking oil, as the latter circulates during the cooking procedure.

The noncondensible gases, which may form or collect in the system, must be removed from the upper regions of the Dowtherm space. In this case, this is accomplished by small pipelines which start in the upper portions of the partitions between the channels, extend down into the bottom jacket of the pan, and thence run horizontally out to the end of the pan where valves are attached.

An additional objective of the invention is the provision of a cooking vessel or pan which is provided with a unique form of base for the cooking trough; in this respect, a series of T-beams join the double wall of the base in such unique and sturdy fashion as to prevent distortion due to contractive and expansive forces which result from the application of different temperatures.

The Dowtherm vapors, in the process to which this invention is applicable, are preferably employed at a pressure from 40 to 60 pounds gage, although it is to be understood that such pressures may be varied within reasonable limits. If the large, flat surfaces of the pan bottom and jacket bottom were to be built without stays, they would have to be excessively thick in order to withstand this pressure. Consequently, it is necessary to stay all such jacketed spaces. This may be done either with stay-bolts or any other structural forms such as rectangular sections, T-beams, or channel beams. In this case, T-beams are used since they make the construction less costly than any of the other means of staying and since they provide a more rigid structure to withstand the high thermal stresses which occur. In heating and cooling, the pan distorts somewhat or bows in addition to the simple expansion and contraction due to changes in temperature and consequently some very high stresses are developed. The arrangement herein disclosed is adequate to accommodate such stresses.

The invention will now be described with reference to the several drawings, wherein like parts are designated by like numerals and wherein:

Figure 1 is a side elevation view of the cooking trough and related mechanism involved in the invention;

Figure 2 is an end elevation view taken on the line 2—2 of Figure 1;

Figure 3 is an end elevation view of the said cooking vessel taken from the end opposite to that shown in Figure 2;

Figure 4 is an enlarged plan view of the invention shown in Figure 1 but, as shown, broken at points toward the center thereof;

Figure 7 is a section view taken on the line 7—7 of Figure 4;

Figure 8 is a detailed view, taken on the line 8—8 of Figure 4, showing the oil and residue discharge means; and Figure 9 is an enlarged section view illustrating the double wall construction, taken on the line 9—9 of Figure 4.

Figure 5:
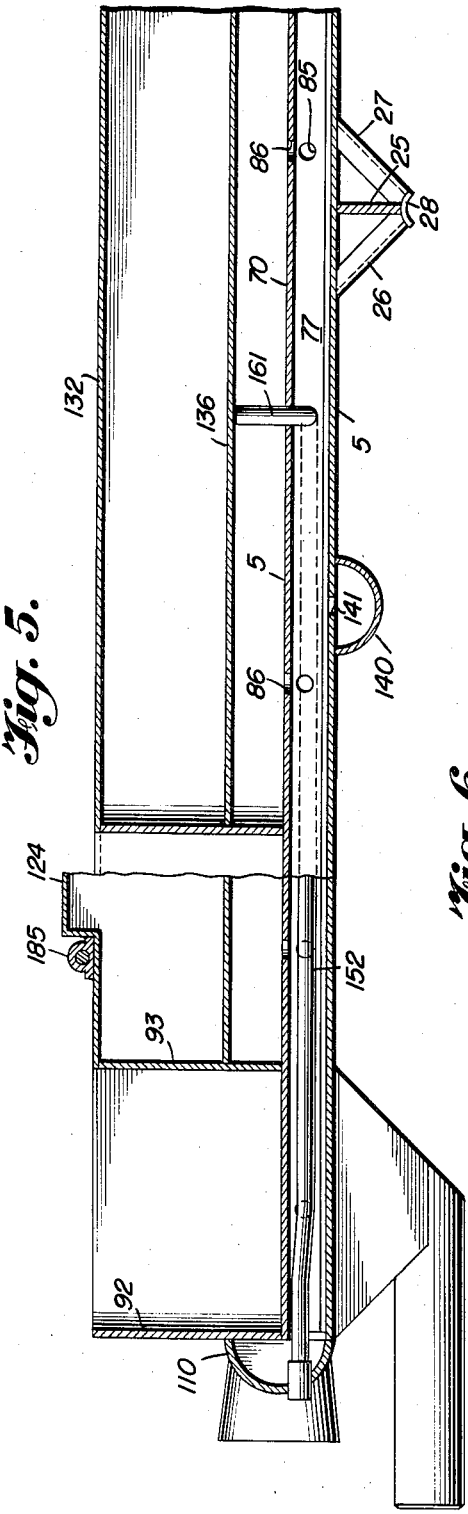
Figure 5 is a section view taken on the line 5—5 of Figure 4 showing one end and a half section of the cooking trough.
Figure 6:
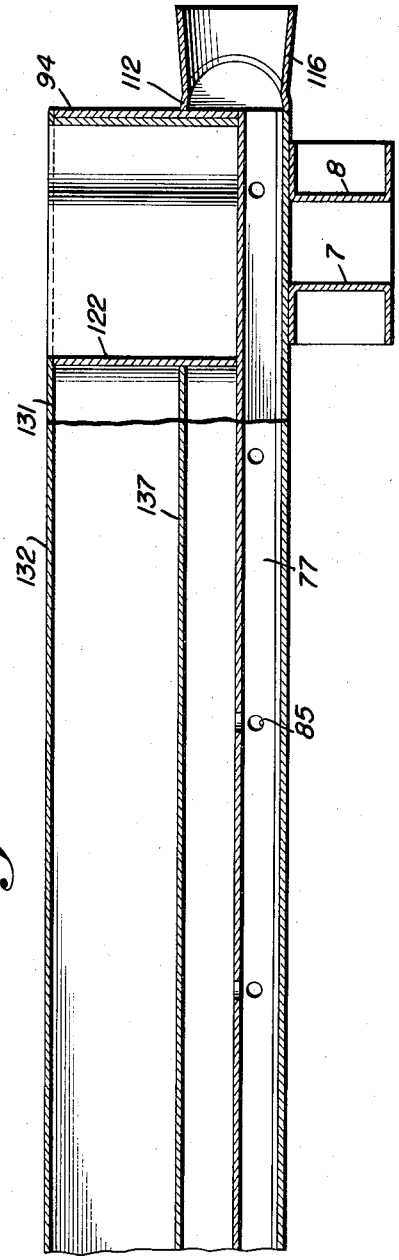
Figure 6 is a view similar to Figure 4 taken on the line 6—6 and showing, in section, the other half of the invention as disclosed in Figure 4.

Referring more particularly to Figure 1 of the drawings, the cooking trough or pan is generally indicated at 1. The unit, particularly the oil contacting portions thereof, may be made of a relatively noncorrosive metal, such as Monel metal or stainless steel. The base 5 of this vessel extends throughout its length and is supported at one end in a stationary manner through the use of two U-shaped girders or structural channels 7 and 8 positioned in the manner indicated in Figures 3 and 5. Additional U-shaped structural channel members 10 and 12 are affixed to the former and at right angles thereto, as shown in Figure 3. This end of the vessel is further supported in the embodiment here shown by an angle iron 15, affixed to or resting upon two opposed and perpendicular stanchions 18 and 19. The parts just mentioned with respect to this mount for one end of the cooking vessel need not be permanently secured in place or secured to the trough in order that the latter can be conveniently moved. This is with the exception of angular braces 20 and 21, added for purposes of structural strength. However, if it be necessary to tie the pan down in some manner to keep it from shifting due to the thrusts of the vapor piping, the angle iron 15 may be bolted to the channels, which, in turn, may be welded to the bottom of the pan.

The opposite support, positioned near but not at the opposite end of the trough, is generally indicated at 35. This support is designed in such manner as to permit suspension of the cooker above ground level in a stable manner and also as to permit any differential caused by heat expansion or contraction of the apparatus to be accommodated by such support. Accordingly, and referring to support 35, it is seen that a depending cross piece 25 (Figure 5), affixed to the bottom of the trough, is held in the position shown in Figure 5 by pairs of angular braces 26 and 27. All three of these elements are welded, as indicated, to the underside of the base 5 at one end and at their respective other ends to a curved or arced member 28, having a convex configuration to accommodate its complementary supporting element 30. The latter is of round or bar cross-sectional configuration and it, in turn, rests upon another framework, generally indicated at 35. The latter, at its upper end, is provided with a concave element 40, similar to concave element 28, and positioned against the referred to bar 30. Each of these elements 28 and 40 are cut upon the same arc or to the same degree and here represent the arc of a circle of approximately 60°.

The framework supporting this last member 40 consists of two vertical stanchions 52 and 54, separated and maintained in the position shown, by two intersecting cross braces 46 and 48, respectively. The lower piece of this framework 35, or the member 42, is of the same configuration as elements 28, hereinbefore described, i. e., cut upon the same segmented arc, so that an additional bar element 38 provides an engaging surface for both the piece 42 and the additional concave element 60. The entire framework just referred to is supported upon the floor 65 by additional vertical braces 62 and 64, affixed to the element 60.

This arrangement of support of this and of the cooking trough will be understood to permit, as inferred above, those deflections to the front or rear which may occur as the result of inherent contractural and expansive forces due to changes in temperature imparted to the unit. Since the several elements, such as 28, 40, 42 and 60, are not secured to the tubular members 30 and 38 as by welding or any other means, the mere weight of the unit maintaining these in place, it will also be understood that even minor lateral deflections which may occur do not affect the function of the supporting mechanism. At any rate, means may be provided both at element 30 and at element 38 to hold the structure 35 in place in the event that the end of the pan should be raised so high that element 35 could normally drop out of position.

The bottom of this cooking vessel is actually of double walled construction; the referred to base 5 is one wall which is spaced from a surmounting wall 70. Both of these walls or bottom plates are maintained in the position shown by a series of T-beams 77 which, in this embodiment, are spaced relatively close together, the flange portions thereof lying in a horizontal plane being no further apart than the overall width of the T thereof, or the width of the portion of the T welded to base plate 5 (Figure 9).

In jacketed cooking vessels of this type, ASTM standards usually require a welded stay construction in order to achieve required safety factors. Such stay constructions generally involve a difficult method of fabrication, where each wall of a double bottom of this type must be apertured to receive individual spacers or stays and then the latter individually welded through such bores to both plates of the double wall. In the instant construction, the T-bars referred to will meet the commercial standards just referred to and, indeed, may surpass the strength requirements which they set forth. Here, welding is accomplished by the drilling or punching of the required number of apertures 80 (Figure 9) in the bottom wall 5 at those places that will intercept the longitudinal frame members or T-beams 77. The stems of such T-beams are then welded, as at 81, to the plate 70, and the flanges of the T-beams are welded to the plate 5 through apertures 80 and 82. The resulting, rigid construction is one that is so unitary in effect as to eliminate any problem of distortion of the apparatus despite comparatively large variations in temperatures imparted thereto.

The space within the double walls of the bottom, the spaces within the various side and end walls of the trough, and the interiors of the several double walled baffle members, all to be described in more detail, are interconnected with a suitable source for the vapor phase treating medium. Such interconnection is of a type to facilitate passage of the heating medium through these several elements with a minimum of obstruction, in order that such medium readily penetrates all of these spaces and, hence, maintains all of these areas at approximately the same temperature throughout the entire unit. Accordingly, the several T-beams which have been referred to are provided with a series of openings 85 through the respective webs thereof in order that the heating vapor can pass throughout the bottom jacket of the pan and throughout the jackets D and E along the outside edges of the pan, as shown in Figure 7. Similarly, the bottom wall 70 is provided with a series of openings 86 which are more or less in alignment with the respective baffle members A, B and C. These openings likewise permit the heating medium to readily penetrate such baffles up to their respective closure plates, to be referred to hereinafter. Thus the entire interior of the double bottom, respective sides and the several baffles are all so interconnected as to be readily filled with the heating medium and, because of the relatively large cross sections of the latter, there is no significant difference in vapor pressure from point to point throughout the entire unit. Since the heating medium is a saturated vapor, this means that its temperature is also uniform from point to point, this being a principal advantage of this invention.

The double wall construction found in the base of the pan and consisting of the two base plates 5 and 70 exemplifies also the construction of the two side walls. For purposes of clarity, and having particular reference to Figure 4, the several double walled structures are generally indicated with corresponding letters. For example, the three intermediate baffles A, B and C are all of a double wall type and all are adapted to receive the heating medium. The same is true of the two side walls D and E. Similarly, the respective ends of the trough also are constructed with jackets F and G which are initially adapted to receive the heating medium. These end jackets are so designed as to be of the same height or same vertical dimension as the blocked off portion on the center walls. In other words, the heating medium is permitted to penetrate these several double walls at a point slightly below the height of cooking fluid in the unit, for purposes which will be explained. This is accomplished by fabricating such semicircular end walls (in cross section) with a radius great enough to extend the same distance upwardly as the two side walls D and E.

Having particular reference to Figures 7 and 9, it is seen that the side walls D and E are identical in structure and similarly utilize T-beams 95, provided as spacers and strengthening members between the outermost side wall and the respective side walls of the pan which are here represented at 90 and 91. These additional T-members in each instance secure jackets 100 to such respective side walls 90 and 91 of the pan. They are welded at their base as by weld 97, placed in an appropriate series of apertures bored in the upright side of the jackets 100. They are also suitably apertured through the respective webs to permit the heating medium to penetrate the space in the jacket above them. At their opposite ends, the T-members 95 are welded to the side wall of the pan as seen in Figure 9, providing with the side wall 90 a rectangular space extending along the entire side of each of the walls 90 and 91. This jacket is secured at its bottom to the bottom plate 5 which is extended laterally on each side of the troughs sufficiently to intercept such jacket 100 as shown in Figure 9. Because the entire unit is one which must effectively prevent escape of Dowtherm vapors, the welds 101 and 105 on each side of the jacket are affixed to, and buttressed and fortified by, additional plates 102 and 106, respectively.

It is to be appreciated that those skilled in the art recognize that Dowtherm vapor is exceedingly difficult to control from the aspect of leakage, more so than, for example, steam or vapors of other organic substances. Accordingly, the particular construction referred to herein is designed as a practical structure effective to maintain a tight seal adequately preventing leakage of the Dowtherm from the various points of interconnection of the several elements of the trough unit.

The two end jackets of the trough have been generally referred to as jackets F and G. As stated above, these take the form of semi-circular enclosures 110 and 112 which are semicircular in cross section. The jacket G extends entirely across the one end of the trough, as observed in Figure 4; the jacket F, at the opposite end of the cooking pan, is necessarily split, as generally indicated at 112 to provide for space for a discharge means which will be described hereinafter. At the top, both end jackets terminate evenly with the tops of the two side jackets D and E.

The two end jackets which have been referred to represent the immediate receiving means for the Dowtherm vapor which is fed to the unit in parallel, i. e., there are two inlets for Dowtherm on each end of the unit. Accordingly, jacket G is provided with the two inlet interconnections 116, 117, and at the opposite end of the trough, the jacket F is provided with two complementary inlets 118, 119.

The mechanism of this invention makes provision for the discharge of air or other impurities such as amounts of non-condensable gases which may accompany this type of heating vapor. Such means will be referred to hereinafter. At any rate, the feed-in at both ends of the unit is of some importance in this respect: by Dowtherm feed-in in this manner, any air or non-condensable gases resident in the unit are normally driven towards the center of the trough where such can be readily collected and discharged. In the preferred embodiment of this invention, the overall length of the trough is approximately twenty-two feet. With this size of apparatus, it has been found that opposed vapor feed-ins, on each end of the unit, are desirable as aiding in the collection of such impurities for their subsequent discharge.

It is to be understood, however, that depending on the pressure of Dowtherm vapors delivered to the pan, the pressure desired in the pan jackets, and the rate of condensation of the Dowtherm vapor in the jackets, feed of Dowtherm vapor may optionally be from headers G only (in which case the Dowtherm vapor flows from one end of the pan to the other) or from both headers F and G (in which case the flow of Dowtherm vapor is from both ends toward the center).

The several intermediate double walled constructions A, B and C are actually baffles which provide, as indicated above, a continuous and circuitous path or channel for flow of the cooking oil and food product. These two baffles thus form a U-shaped configuration, with baffle B extending from the end wall to a point midway between them. For purposes of clarity, and having reference to Figure 7, the elements of these two walls or baffles are given different reference numerals. For example, the baffle A is comprised of two side plates 120 and 121, affixed to the base plate 70, and, of course, perpendicular thereto. These two side plates are surmounted by a top plate 124. The height of the baffle designated generally at A, from inspection of Figure 7, is found to be greater than the heights of the other two baffles B and C. For practical purposes, this is desirable since this initial baffle A is immediately adjacent to the feed-in of the product and the increased height assures containment of the oil within this initial passageway where otherwise there may be undue splashing thereof due to actuation of whatever means is employed to propel the charge of oil and food product through the multipass channels of the pan. Furthermore, the uncooked product is fed into the unit at this end. The higher wall is utilized as a protective measure because the rapid boiling off of the water in the raw potatoes causes a very vigorous evolution of vapor at this point.

The same construction, as described below, is followed with respect to each of the baffles: such are sealed off at a predetermined point so that the heating medium is permitted to only reach a certain height within the baffle. The sealing means with respect to baffle A is a plate 135 which extends throughout the length thereof. This sealing means or plate is located at a distance equally or only slightly below the predetermined height of the fluid level of the cooking oil. The Dowtherm in the jackets can be maintained at a temperature higher than the oil, because in general the Dowtherm heated surfaces are in contact with moving oil to which heat is transferred and consequently the temperature of the metal surface is kept under control. For several inches above the actual working level of the cooking oil, spray or spatters of oil may deposit small amounts of oil on the upper part of the baffles, but these do not conduct away the heat of the Dowtherm so that the temperature of the metal in these areas, if they were heated, could rise to the point where such spattered oil can be partly decomposed or burnt. As mentioned before, if the partly decomposed material drops into the cooking oil itself, such part of the decomposed material can accelerate further decomposition. Even if it does not, the removal of such partly baked on material during cleaning periods is very difficult. Accordingly, the means just referred to prevents penetration of the Dowtherm or other heating medium within each of the baffles to a point slightly below the fluid level.

A like arrangement is followed in providing the additional baffles B and C. Referring to the latter first, the two side plates 128 and 130 are surmounted by a top plate 131, and these side plates are blocked off by an additional spacer 137 to accomplish the purposes just enumerated—prevention of the heating medium from flowing above a predetermined point slightly below the height of the cooking fluid. Actually and as indicated above, the top plates 134 and 131 and the accompanying elements of the two baffles A and C interconnect at one end of the cooking chamber as shown in Figure 4. These two double walled constructions actually form a U-shaped configuration.

This referred to U-shaped configuration is bisected by the central baffle B. As shown in Figure 7, the latter is of identical construction except that the top plate thereof is extended as shown in Figure 4 to approach the end jacket G and to form a circular passageway on each side of the pan for reception of the cooking medium. This central jacket or baffle B is similarly comprised of two side plates 122 and 123, a surmounting plate 132 and an interior divider or spacer 136 that seals off the upper portion of such jacket from the Dowtherm vapors. Such spaces for reception of the heating medium are therefore confined in each instance to a definite level which approximates, or preferably, is slightly below, the level of the cooking fluid. Thus, the respective tops of the side jackets 100 and the spacers or dividers 135, 136, 137 are all in the same plane. A like comment is applicable with respect to the end jackets F and G which, as stated, are located so that the top of the tubular elements 110 and 112 terminate at a point matching these referred to dividers or spacers.

The described several baffle structures are entirely included within the primary tank or container construction which consists of the referred to side walls 90 and 91 and the two end walls 92 and 94. The two baffle structures A and C, terminating in an attached, U-shaped configuration, as seen in Figure 4, call for another vertical partition 93, which actually is a continuation and interconnection of the outer side walls 120 and 130 of the respective baffles A and C. The zig-zag path created by these baffles is even throughout as may be observed by reference to Figure 4 where the central baffle member is constructed so that its respective side walls 122 and 123 flare outwardly to form a smooth curve meeting the end wall 94 and the side walls of the pan, 90 and 91. These curved plates are surmounted by the top plate 132, or that cover for the central baffle B, this top plate being shaped to match the curvature of the side walls of the central baffle, as just described. At the opposite end of the container, the opposed corners thereof are also provided with smaller baffles or fill-ins 96 and 97 which smooth out these corners for the even flow of the cooking fluid around the tortuous path necessitated by the several baffle constructions.

At times, especially when the pan has been idle and the heating spaces or several double walled constructions (A to G, inclusive) are full of air, this air must be vented from the several jackets. Also, as indicated above, certain small amounts of noncondensable gases may accompany the heating vapors and they also must be removed. It is well known that the presence of noncondensible gases in a vapor-phase heating medium decreases the rate of heat transfer. If there is a positive flow of the heating vapor through the apparatus, this can wash noncondensibles to a certain point where they can form a pocket and prevent the further entrance of heating vapors. The primary reason for their removal is the fact that, if they are not removed, they greatly decrease the rate of heat transfer by blanketing the heat transfer surface and thereby slow down the operation of the pan. The remaining means here employed takes the form of a number of outlets for such impurities terminating near the center line of the entire unit and positioned in each of the several double walled constructions which make up the side walls of the unit as well as the several baffles A, B and C. As herein shown, such means is found in the several outlet pipes 150, 151, 152, 153 and 154 (Figure 4), each of which is turned upwardly and at right angles as at 160, 161, 162 (Figure 7) to terminate immediately underneath the top or cover plate of each of said baffles and side walls. Such pipes are placed through the jacket 110, conducting these impurities to the exterior of the cooking unit.

Since the flow of the Dowtherm vapor is caused on the one hand by the pressure in the supply header, and on the other by the condensation of the Dowtherm vapor, it follows that air and other noncondensibles will flow to the end of the Dowtherm path, which is the top of the space inside the baffles. Hence, if the pan is fed with vapor from both ends (through headers G and F), such noncondensible gases are collected at the top of the baffles, such as the top of outlets 160, 161, 162. The existing pressures in the system will then force these impurities through the various outlets or discharge lines, as above identified.

The condensate of the heating medium is removed through the several baffles and side jacket openings 86 in the bottom wall 70 and thence into a trough 140 through openings 141 in the bottom plate 5. This condensate receiving trough extends laterally across the cooking vessel and is positioned immediately adjacent the bottom plate 5 as shown in Figure 5. The apertures 141 are suitably spaced so as to interconnect the side jackets and several baffles with the trough, as will be appreciated. In actual practice, the bottom 5 may be fabricated in such manner that there is a slight downward angularity on both sides of the unit toward the trough 140 to facilitate drainage in its direction. This trough is provided with a discharge spout 145.

Since equipment used for cooking food products must be cleaned at frequent intervals, it is desirable that the cooking oil in the pan be drained, and obviously this draining should consume the minimum time. The means here provided for this purpose consists of a discharge outlet or hopper 170 here shown as rectangular in configuration and opening directly into the bottom plate 5 at one end of the unit. The hopper 170 is comparatively large in dimension, as shown in Figure 4, and feeds directly into a discharge line 172 to a suitable discharge point. The discharge line is fitted with a suitable valve closure, not shown, which is kept closed during normal operation of the unit.

From the foregoing, the nature of this so-called mutipass assembly can be readily understood. When filled to a predetermined level with cooking oil, the latter, together with the raw potatoes, is driven through a circuitous course 30 necessitated by the several baffles A, B and C, such course, if represented in straight line fashion, approximating four times the length of the vessel. Progress of the material through the apparatus is facilitated by a mechanical means such as a paddle wheel 180 rotated in a direction to drive the oil from the inlet side of the vessel through the referred to circuitous passageways and back again to this propelling means in a continuous manner. The paddle 180 is mounted on appropriate bearings 185, 186 located on or near a lowered elevation of the top plate 124 (Figure 5) and on the side wall 90 of the tub itself. This propelling means is driven through a shaft 181, to which the paddle wheels are attached, by means of a pulley 190 inter-connected with suitable power means, not shown.

The charge of raw potatoes to the system is accomplished through the use of a conveyor 200, here shown as an endless conveyor provided with a conveyor belt 201 motivated by any suitable means. The conveyor 200, or the charge conveyor which delivers the raw food product to the cooker, is slanted as indicated in Figure 1, the potatoes being conveyed into the unit with the discharge end of the conveyor over the paddle wheel 180 so as to be discharged into the moving body of oil. On the opposite side of the unit and at this same end thereof is provided an additional conveyor 205, likewise fitted with an endless conveyor belt 208 adapted to remove the cooked product from the oil stream. This latter conveyor 205 is, however, tilted upwardly in the opposite direction with the downward end sufficiently submerged in the oil stream as to receive the floating and cooked chips thereupon. The latter, already proceeding on top of the cooking oil in the direction of the conveyor 205 by flow of the oil, are carried out of the unit to an appropriate discharge point by movement of the belt in the obvious direction to attain this purpose. The conveyor 205 is preferably of a width slightly less than the distance between the double wall construction C and the side wall 91 for the purpose of blocking or prevention of by-passing of the cooked product beyond and behind the conveyor. It is thus to be appreciated that the apparatus provides for a continous and uninterrupted cooking procedure. Charging of raw product into the unit and removal of cooked potato chips may be regulated so as to proceed at an even rate, the cooking taking place during the circuitious flow of the cooking medium through the several zig-zag channels formed by the various double walled constructions.

The speed of rotation of the paddle 180 or the speed of flow of the oil as performed by any means other than that illustrated is not particularly significant; this is because proper production of the product desired is dependent largely upon a temperature factor, at least within certain limits. Those skilled in the art are, accordingly, able to regulate the speed of flow and, as a dependent variable, the temperature of cooking in such fashion as to balance these factors in order to attain a desirable product.

In practice of the commercial embodiment of this invention, the finished chips leaving the pan carry up to 40% of cooking oil by weight, or, for every ton of cooked potato chips produced by the apparatus of this invention, it will be found that about eight hundred pounds of oil is absorbed by them. This means that make up oil must be constantly or at least frequently or periodically added to the trough to make up for the referred to loss. Such is added through a discharge line 230 which may be located on the center line of the apparatus and at one end thereof as indicated in Figures 2, 3 and 4.

Reference has been made to the overall size of the preferred embodiment of the invention, herein described. In the exemplification of the invention herein contemplated, the overall length of the trough would be approximately 22′ and the width thereof about 6′, each figure excluding the side and end jackets. Although the size of the apparatus can obviously be varied and still attain the functional purposes thereof, further reference is made to certain dimensions to clarify the relative size of the several baffle members and, as well, the end and side jackets. These relative sizes are of some importance inasmuch as these components must have interior passageways of sufficient dimension to permit free and unobstructed passage of the heating medium therethrough. Accordingly, each of the baffles A, B and C in this embodiment of the invention would have an overall width of from approximately four to five inches. Such width of the baffles and end and side jackets will then approximate ⅙ of the interior of the frying container. Similarly, and having reference to this same embodiment, the height of the several baffles above the bottom plate 70 is from about four to five inches, this, in accordance with the discussion above, representing the approximate height of cooking fluid in the vat. With comparable dimensions as to the related components of the invention, it is seen that the all-important vapor passageways for the Dowtherm heating agent are sufficiently free and open to permit the desired flow of that medium through the apparatus, with consequent ease of control insofar as temperature ranges are concerned.

The means described herein offer a practical solution to the problem of maintenance of an even and controlled temperature throughout the entire body of cooking oil. The main objective which is attained, that of accurate temperature control within rather narrow limits, is most difficult if not impossible to accomplish by any form of mechanism based upon the direct firing principle.

The objectives named herein are accomplished in part by the use of a vapor phase heating medium of the Dowtherm type; a further contributing factor permitting such control is the use of means, as herein described, which permit relatively large volumes of the heating medium to flow throughout the apparatus without substantial impairment or obstruction. The fact that such heating medium is introduced in parallel on each end of the unit aids materially in this heating operation, wherein such flow is not only even but produces a flow towards the center of the unit to drive off any impurities present in the initial or subsequent stages of the cooking operation. The rather large cross-sectional area of each of the baffles which form the circuitous flow path provides a relatively large contact area for the oil, and the fact that each of such baffles as well as the bottom, end and side double-walled jackets are blocked off at a point which is approximately coincidental with the plane of the fluid level, prevents undue scorching or other deterioration of the oil because of the application of excessive heat. Since a vapor phase heating medium is used, and in view of the relatively large area to which same is admitted, control of temperature or variation of temperature to a desired point may be quickly regulated merely by control of pressure of the heating vapors to the apparatus. These various factors are all important from an apparatus as well as method standpoint, for they all readily enable the operator to regulate the temperature, time of cooking and other variables in such manner as to produce a product of the highest quality.

It is obvious that this invention may be varied somewhat from the specific embodiment herein disclosed. Although other means and expedients may be employed to accomplish the purposes thereof, it is to be understood that my invention is limited only by the scope of the following claims.

I claim:

1. In a potato chip cooking apparatus, an oil containing pan adapted to receive cooking oil to a predetermined level, said pan having a double bottom and a plurality of baffles therein, said baffles dividing said pan into a series of zig-zag, interconnected channels, end and side jackets mounted on said pan, said baffles having horizontal partitions at the approximate height of said predetermined level, said end and side jackets extending upwardly to the height of said partitions, a potato discharge means leading into the first of said channels, means to circulate said oil and said potatoes through said series of channels, and means to heat said oil to a predetermined and constant temperature, said last-named means comprising heat exchange media at all contacting areas of said oil with said pan and including means to admit a vapor phase heating medium at elevated temperatures to said side and end jackets on said pan, said jackets communicating with said double bottom, said baffles having hollow, continuous interiors, said interiors interconnecting with said jackets, said partitions in said baffles preventing said medium from rising in said baffles to a height substantially above the predetermined level of said oil.

2. In a potato chip cooking apparatus, an oil containing pan adapted to receive cooking oil to a predetermined level, said pan having an enclosed, double bottom, said pan having a plurality of interconnected baffles therein, said baffles dividing said pan into a series of zig-zag, interconnected channels, hollow end and side jackets mounted on said pan in communication with said double bottom, said baffles having interior, horizontal partitions at the approximate height of said predetermined level, said end and side jackets extending upwardly to the height of said partitions, a raw potato discharge means leading into the first of said channels, paddle means to circulate said oil and said potatoes through said series of channels, said channels being of a width approximating one-sixth of the width of said pan, means to heat said oil to a predetermined and constant temperature, said last-named means comprising heat exchange media at all contacting areas of said oil with said pan and including means to admit a vapor phase heating medium at elevated temperatures to said double bottom and said end and side jackets on said pan, said baffles having hollow, continuous interiors, said interiors interconnecting with said jackets, said partitions in said baffles preventing said medium from rising in said baffles to a height substantially above the predetermined level of said oil.

3. In a potato chip cooking apparatus, an oil containing pan adapted to receive cooking oil to a predetermined level, said pan having an enclosed double bottom with a vapor receiving space therein, said pan having a plurality of hollow baffles therein and end and side jackets mounted on the exterior of said pan, said baffles being hollow and interconnected with each other and said jackets, said jackets being interconnected with said double bottom, said baffles having horizontal partitions at the height of said predetermined level, said end and side jackets extending upwardly only to the height of said partitions, a potato discharge means leading into the first of said channels, means to circulate said oil and said potatoes through said series of channels, means to heat said oil to a predetermined and constant temperature, said last-named means comprising heat exchange media at all contacting areas of said oil with said pan and including means to admit a vapor phase heating medium at elevated temperatures to said double bottom, said side end jackets on said pan, said partitions in said baffles preventing said medium from rising in said baffles to a height substantially above the predetermined level of said oil, and means to remove impurities found in said vapors comprising inlet means opening into the upper portion of the interior of said jackets, said inlet means being interconnected with a discharge line leading to a point exterior of said pan.

4. In a potato chip cooking apparatus, an oil containing pan adapted to receive cooking oil to a predetermined level, said pan having a plurality of hollow baffles therein and being provided with a vapor-receiving double bottom, said baffles dividing said pan into a series of interconnected channels, a potato discharge means leading into the first of said channels, means to circulate said oil and said potatoes through said series of channels, means to heat said oil to a predetermined and constant temperature, said last-named means including heating medium receiving jackets on each end of said pan in interconnection with said double bottom and said hollow baffles, means to remove impurities in said medium from said baffles, said baffles having continuous interiors interconnecting with said jackets, means in said baffles to prevent said medium from rising in said baffles to a height substantially above the predetermined level of said oil, and means to remove vapor condensate from said baffles, said double bottom and said jackets, and to recycle said condensate to the vapor source.

References Cited in the file of this patent

UNITED STATES PATENTS

| | | |
|---|---|---|
| 18,271 | Bate | Sept. 29, 1857 |
| 684,623 | Tucker | Oct. 15, 1901 |
| 1,520,860 | Denz | Dec. 30, 1924 |
| 1,531,256 | Morrow | Mar. 24, 1925 |
| 1,707,786 | Ehrhart | Apr. 2, 1929 |
| 1,882,809 | Grebe | Oct. 18, 1932 |